United States Patent Office 3,168,190
Patented Feb. 2, 1965

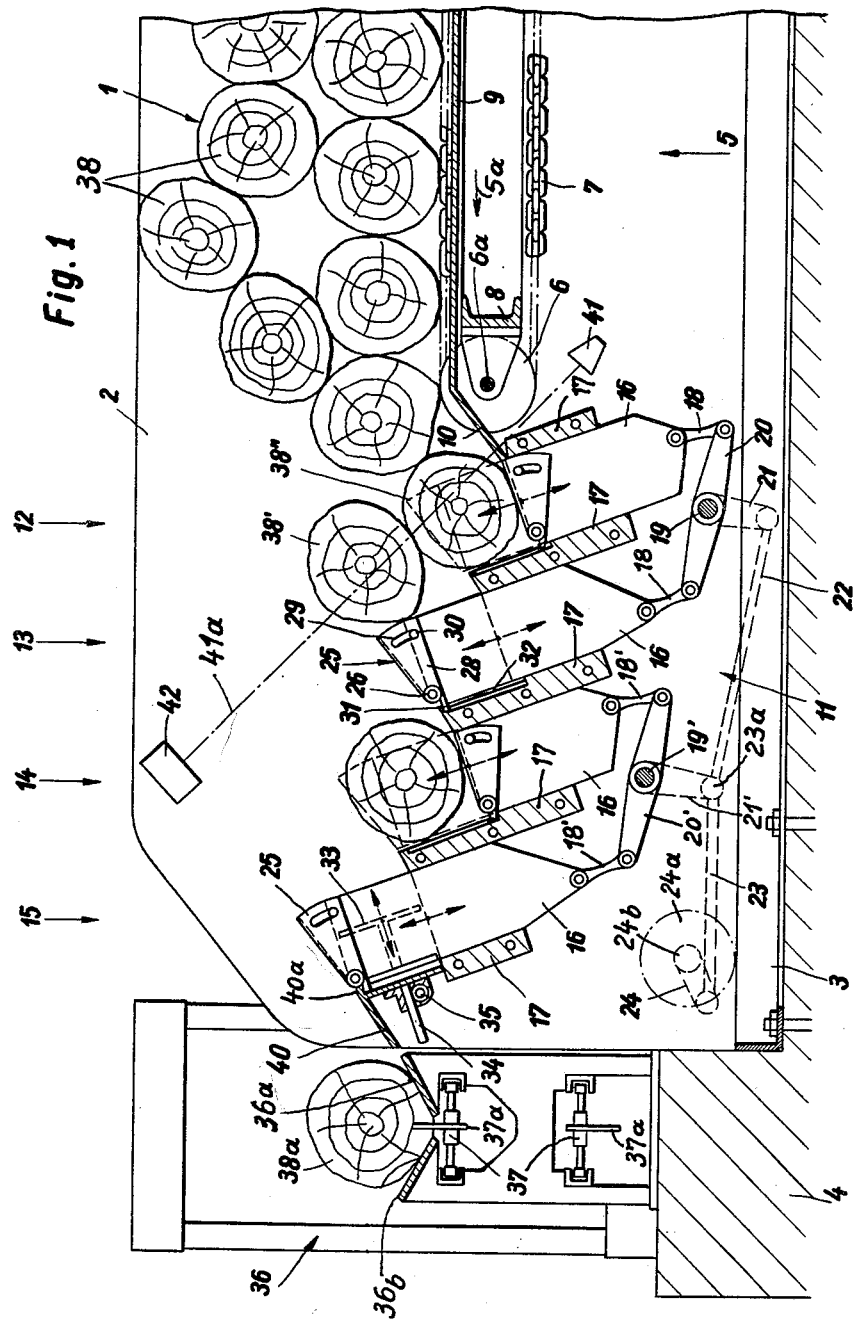

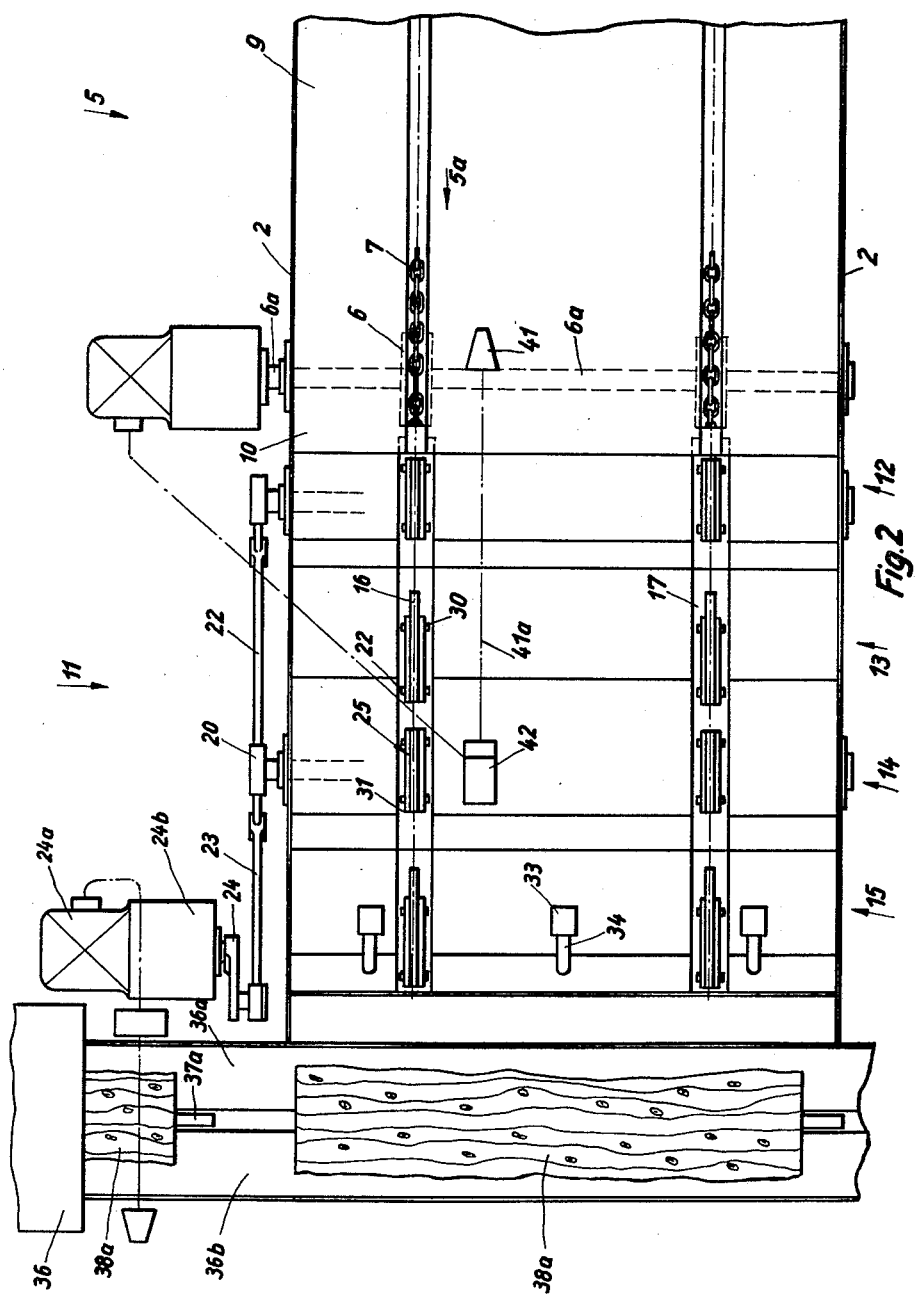

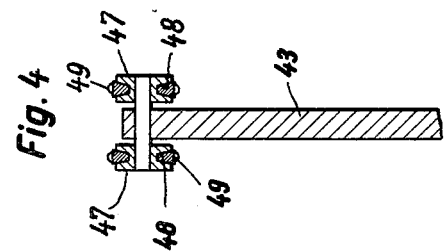
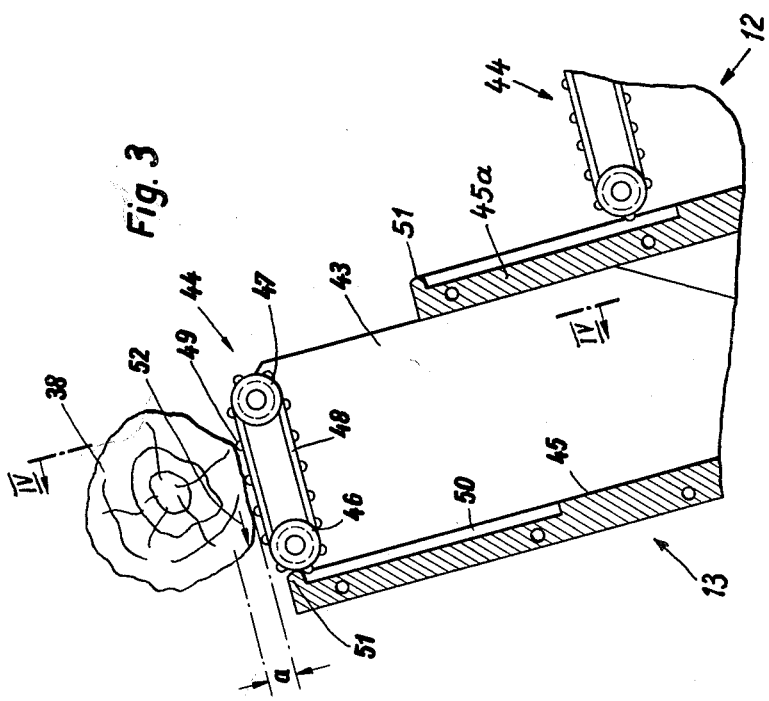

3,168,190
APPARATUS FOR TRANSFERRING LOGS AND LIKE OBJECTS
Heinz Nienstedt, Zum Nonnenberg 8, Recklinghausen, Germany
Filed Feb. 19, 1962, Ser. No. 174,209
Claims priority, application Germany, Feb. 20, 1961, N 19,626
12 Claims. (Cl. 198—218)

The present invention relates to an apparatus for transferring logs and like bulky objects, and more particularly to a so-called yarding apparatus which is utilized for transferring logs from a mill yard to a sawmill or to another treating or processing station.

An important object of the invention is to provide an apparatus which is capable of transferring barked and/or unprocessed logs, which may be utilized for simultaneous transfer and lifting or lowering of logs to a different level, which occupies comparatively little space, and which is capable of automatically removing logs from a pile and of automatically transferring logs to the carriage or to another wood processing station of a sawmill.

Another object of the invention is to provide an apparatus of the just outlined characteristics which may be rapidly and conveniently converted for transfer of differently dimensioned logs or like bulky objects, which is capable of transferring straight and/or partly or strongly deformed (crooked) logs, and which requires little or no attention once it is put to actual use.

A further object of the instant invention is to provide an apparatus of the above described type which may be operated intermittently or continuously, depending on the requirements of the machine or machines to which the logs are transferred, which may be utilized for simultaneous transfer of two or more logs to one or more processing machines, which can replace a large number of workmen, and which performs operations of the type which, if carried out by hand, are most likely to cause serious injuries to and requiring substantial physical effort from the operators.

A concomitant object of my invention is to provide an apparatus for yarding logs wherein the transfer of logs may be initiated or terminated in rhythm with the requirements of the processing machine to which the logs are being transferred, and which may be rapidly converted from fully automatic operation to operation by manual control or vice versa.

With the above objects in view, the invention resides in the provision of an apparatus for transferring elongated objects, particularly for transferring substantially round logs from a woodpile, comprising a multistage transfer conveyer having at least two stages including a first stage and at least one next stage which is preceded by the first stage and which may precede one, two or more addtional stages, substantially upwardly and downwardly reciprocable pusher means in each stage of the transfer conveyer and each comprising a log-supporting upper portion, means for reciprocating the pusher means so that the pusher means in each preceding stage performs an upward stroke when the pusher means in the next stage performs a downward stroke or vice versa and that the upper portion of the pusher means in each preceding stage is moved into temporary alignment with the upper portion of the pusher means in the next stage during each upward stroke of the pusher means in the respective preceding stage whereby a log supported by the upper portion of the pusher means in a preceding stage may be conveniently transferred onto the upper portion of the pusher means in the next stage when the upper portions of pusher means in a preceding stage and in the next stage are aligned with each other, and conveyer means for supplying logs to the upper portion of the pusher means in the first stage in a position of the pusher means in the first stage in which its upper portion is located at a level below the upper portion of the pusher means in the stage next to the first stage.

Certain other features of the invention reside in the provision of a multistage transfer conveyer which may comprise two or more pairs of stages, in special construction and mounting of the pusher means in each stage, in the provision of a control system which automatically starts and/or arrests the transfer conveyer or the supply conveyer means when necessary, in the provision of combined log-supporting and impulse generating means which are mounted on or which constitute the upper portions of the pusher means and which automatically advance the log or logs from the upper portion of the pusher means in a preceding stage onto the upper portion of the pusher means in the next stage, and in the provision of specially constructed reciprocating means for the pusher means.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a vertical section through an apparatus for yarding logs which embodies one form of my invention, the section of FIG. 1 being taken along the line I—I of FIG. 2, as seen in the direction of arrows;

FIG. 2 is a top plan view of the apparatus;

FIG. 3 is an enlarged fragmentary partly elevational and partly sectional view of modified pusher means which may be utilized in the apparatus of my invention; and FIG. 4 is a fragmentary transverse section as seen in the direction of arrows from the line IV—IV of FIG. 3.

Referring now in greater detail to the illustrated embodiments, and first to FIGS. 1 and 2, there is shown an apparatus for transferring or yarding logs from a woodpile 1 to a carriage 36. The logs 38 of the woodpile 1 are assumed to be of equal length and are stacked between a pair of spaced parallel upright walls 2. The distance between the walls 2 at least equals but preferably exceeds the length of the logs 38, and these walls are secured to a casing 3 which in turn is mounted on a base 4. The logs 38 in the pile 1 may but need not be parallel or nearly parallel to each other.

The logs 38 of the woodpile 1 rest on the upper run of a supply conveyer assembly which includes two spaced parallel chain conveyers 5 serving as a means for advancing the logs in the direction indicated by the arrow 5a and each of which comprises pairs of sprockets 6 and an endless flexible element here shown as a chain 7 which is trained around the respective pair of sprockets. The sprockets 6 are mounted on shafts 6a rotatable in frame means 8 secured to the walls 2. The frame means 8 supports bottom plates 9 of sheet metal or the like which extend between the chains 7 and whose front end portions 10 are inclined downwardly so as to form a slope or chute constituting the discharge end of the supply conveyer assembly.

The apparatus further comprises a novel multistage transfer conveyer 11 which is located between the supply conveyer assembly and the carriage 36 and whose purpose is to intermittently admit logs 38 to the endless log advancing conveyer 37 of the carriage 36.

The transfer conveyer 11 comprises four stages or sections 12, 13, 14 and 15, and each of these stages includes a pair of spaced forwardly and upwardly inclined lifting members in the form of pushers or rams 16 which are reciprocable in parallel paths between similarly inclined guides or ways 17, the latter fixed to the walls 2. The pushers 16 may be made of sheet metal and, in order to economize with space, the left-hand guides 17 of the pushers in the stages 12–14 preferably constitute the right-hand guides for the pushers in the stages 13–15, respectively.

The lower end portions of adjacent pushers 16 in the stages 12, 13 are articulately connected with motion transmitting links 18 which are secured to the opposite ends of rockable two-armed levers 20 rigidly mounted on a horizontal shaft 19, the latter turnably journalled in the walls 2 and substantially parallel with the longitudinal extensions of the logs 38. The shaft 19 and hence the levers 20 are rockable by a lever 21 which is articulately connected with a composite connecting rod 22, 23, the latter receiving motion from a crank arm 24 mounted on the output shaft 24b of a prime mover in the form of an electric motor 24a. The links 18 of the pushers 16 in the stages 12, 13, the corresponding levers 20, the connecting rods 22, 23 and the prime mover assembly 24–24b together constitute means for reciprocating the pushers 16 in the stages 12, 13 in such a way that the pusher in the first stage 12 moves upwardly when the pusher in the next stage 13 descends or vice versa.

The pushers 16 in the stages 14, 15 are reciprocated in a similar manner by links 18′, by levers 20′ (the latter mounted on a second shaft 19′), and by a lever 21′ which latter is secured to a pivot pin 23a that links the components of the composite connecting rod 22, 23. The arrangement is such that the pusher 16 in the preceded stage 14 descends when the pusher in the preceding stage 13 rises, and that the pusher in the preceded stage 15 descends when the pusher in the preceding stage 14 rises, or vice versa. The shafts 19, 19′ extend rearwardly and beyond the wall 2 of FIG. 1, and the levers 21, 21′ are secured to their respective shafts at the outer side of this wall.

The upper portion of each pusher 16 carries a log supporting device which is adapted to generate and to impart to a log an impulse in a sense to advance the log onto the impulse generating device of the next pusher. In the embodiment of FIG. 1, each combined log-supporting and impulse generating device comprises a two-armed lever 25 which is turnable about a horizontal pivot member 26 secured to the pusher 16 adjacent to the left-hand side thereof, i.e. adjacent to the left-hand guide 17 for the respective pusher. The longer arm 28 of each lever 25 is provided with a pair of spaced downwardly extending fan-shaped extensions or flaps having arcuate cam slots 29 for guide pins 30 which are secured to the upper portion of the respective pusher 16 and which permit the arm 28 to turn about the respective pivot member 26 to the extent determined by the length of the slot 29. The shorter arms 31 of the levers 25 extend into elongated grooves 32 provided in the adjacent left-hand guides 17 for the respective pushers. Each groove 32 terminates below the upper end of the respective guide 17 so that the latter forms an internal shoulder which acts as a stop means for rocking the respective lever 25 in anticlockwise direction (as viewed in FIG. 1) when the respective pusher is moved in upward direction and the lower arm 31 reaches the upper end of the respective groove 32.

When the arms 31 are distant from the upper ends of the respective grooves 32, the levers 25 automatically assume the positions occupied in FIG. 1 by the levers 25 in the stages 12 and 14. The upper sides of the longer arms 28 associated with the pushers 16 in the first stage 12 are then flush or nearly flush with the chute 10 provided, of course, that the pushers in the stage 12 assume or are near to their lowermost positions.

The last stage 15 of the transfer conveyer 11 comprises an adjustable baffle plate 33 which extends between the pushers 16 and which is movable in a direction toward and away from the stage 14 (i.e. in directions perpendicular to the direction in which the pushers reciprocate) by an adjusting mechanism including a rack 34 and a meshing pinion 35 so as to adjust the capacity of the stage 15. The adjusting mechanism 34, 35 is mounted on the left-hand guides 17 of the pushers in the stage 15. These left-hand guide support at their upper ends a downwardly inclined chute 40 which is aligned with the right-hand panel 36a of a stationary trough forming part of the carrier 36. The exact construction of this carrier forms no part of my invention. In the embodiment of FIGS. 1 and 2, the carrier 36 comprises an endless chain conveyer 37 which is provided with spaced entraining members 37a travelling between the mutually inclined panels 36a, 36b of the trough and engaging the rear end faces of the logs 38 so as to advance the logs along the trough and against a saw blade, not shown, or through a counting machine. The longitudinal direction of the upper run of the chain 37 is parallel with the longitudinal extensions of the logs 38.

The apparatus of FIGS. 1 and 2 operates as follows:

In FIG. 1, the pushers 16 in the stages 12, 14 are shown in their lowermost positions and are assumed to be about to start their upward strokes which take place simultaneously with downward strokes of the pushers in the respective preceded stages 13 and 15. The longer arms 28 of the impulse generating levers 25 mounted on the upper portions of the pushers 16 in the first stage 12 support an upper log 38′ and a lower log 38″. As the pushers 16 in the next stage 13 begin to descend, the levers 25 supported by their upper portions are free to pivot in clockwise direction because the lower arms 31 of these levers are then moved away from the respective shoulders at the upper ends of the associated grooves 32. Thus, the upper sides of the arms 28 in the stage 13 assume positions of inclination corresponding to the inclination of the arm 28 in the stage 12 of FIG. 1. Consequently, the upper log 38′ will be free to roll onto the pushers 16 in the stage 13 as soon as these pushers descend to a predetermined extent, i.e. as soon as the upper portions of the pushers in the stage 12 are substantially or fully aligned with the upper portions of the pushers in the adjacent stage 13, and the log 38′ then comes to rest on the arms 28 and eventually against the left-hand guide 17 in the stage 13. The log 38′, now assumed to be supported by the pushers 16 in the stage 13, hinders the log 38″ from entering the stage 13 because (and as shown in FIG. 1) the diameter of the log 38′ approximates or even exceeds the width of the pushers in the stage 13. Consequently, the log 38′ performs an upward and a subsequent downward stroke in the stage 12 without being transferred into the next stage 13. Of course, if the stack of logs in the pile 1 is very high, it can happen that the stage 13 receives two logs at a time and that even the stage 14 receives two logs instead of one. The purpose of the multi-stage transfer conveyer 11 is to insure that the last stage 15 receives only such numbers of logs at a time as must be transferred to the carrier 36. Depending on the height of the pile 1, on the dimensions of the logs and on the selected capacity of each stage, the number of stages in the transfer conveyer 11 may be increased to six or more or, alternately, this conveyer may operate with less than four stages, for example, with the stages 12 and 13. It will be readily understood that the trough 36a, 36b of the carrier 36 and the upper runs of the chains 7 need not be located at the same level, i.e. that the conveyer 11 may also serve as a means for raising the logs from the level of the conveyers 5 to the level of the trough 36a, 36b or for lowering the logs from the level of the conveyers 5 to the level of the trough.

The levers 25 become active shortly before the respective pushers 16 reach the upper ends of their strokes. Thus, the log 38a shown in FIG. 1 as being located in the trough 36a, 36b was ejected by the levers 25 of the pushers 16 in the last stage 15 shortly before these pushers have reached their upper end positions. The sudden impulses generated by the levers 25 when the respective shorter arms 31 strike against the stop shoulders at the upper ends of the associated grooves 32 are sufficient to impart necessary movement to the logs so that the logs are actually thrown onto the next pushers or onto the chute 40. The length of the arms 28 preferably exceeds several times the length of the corresponding arms 31 so that the angular movement of the arms 28 is very rapid and generates the impulses necessary for transfer of logs in a direction toward or into the carrier 36. Of course, even if the angular movements of the arms 28 are comparatively slow, the inclination of these arms increases sufficiently to bring about a rolling or sliding movement of the logs onto the next set of pushers or onto the chute 40.

As a rule, and particularly when the diameters of the logs in the pile 1 are nearly uniform, the width of the pushers 16 (and hence the capacity of the stages 12–15) is selected in such a way that only one log can come to rest on the respective arms 28. In other words, while it can happen that two logs enter a stage at the same time so that one thereof is supported by the other log (see the logs 38', 38" in the stage 12 of FIG. 1), there is no room for two logs in side-by-side relation. However, if the logs in the pile 1 are of different diameters, the operator actuates the mechanism 34, 35 in a sense to move the baffle plate 33 to a selected position corresponding to the minimum diameters of the logs so that the capacity of the last stage 15 is changed and that this stage will receive only one log at a time. It will be readily understood that each of the stages 12 to 15 may be provided with a baffle plate 33, if desired. The plate 33 may be replaced by pairwise arranged stops in the form of strips, brackets or the like which are adjustably connectable to the pushers in the last stage 15 and/or in the other stages.

The operation of the yarding apparatus may be performed in a fully automatic way and is usually controlled by the requirements of the carriage 36. Thus, when the trough 36a, 36b of the carriage is free to receive a new log, the prime mover 24a receives an impulse to reciprocate the pushers so that the pushers in the stage 15 transfer a log onto the chute 40. The operator may start the prime mover 24a by hand or, alternately, the prime mover may be operated continuously if the chute 40 is hinged to the left-hand guide 17 of the stage 15 (as at 40a) and is swung in anticlockwise direction, as viewed in FIG. 1, whenever the trough 36a, 36b is not free to receive a new log. The logs already received in the stages 12 to 15 then merely reciprocate with the pushers 16 until the operator finds it necessary to return the chute 40 to the position of FIG. 1 so that the log already received in the stage 15 may be transferred into the trough 36a, 36b.

It will be noted that the conveyors 5 supply one or more logs onto the upper portions of the pushers 16 in the first stage 12 at a time when the upper portions of these pushers are located at a level below the upper portions of the pushers in the next stage 13, and the same applies to the pushers in the stages 13, 14 and 14, 15. During each stroke of a pair of pushers in a given stage, the upper portions of these pushers move into temporary alignment with the upper portions of pushers in the next stage. Of course, it is equally possible to arrange the pushers in such a way that the upper portions of the pushers in the stage 12 are aligned with the upper portions of the pushers in the stage 13 at the exact time when the pushers in the stage 12 reach the upper ends of their strokes. However, in all embodiments of my invention, the arrangement is such that the ascending upstream pushers move into alignment with the descending downstream pushers before or at the time when the ascending pushers reach the upper ends of their strokes.

FIG. 1 further illustrates a control system which regulates the operation of the conveyors 5. This control system is operatively connected with the motor means for the sprockets 6 and includes a light source 41 located at a level below the front sprockets 6 and a photoelectric cell 42 which is connected in the circuit of the motor means for the sprockets 6 and starts this motor means whenever the light beam 41a emanating from the source 41 is free to reach the cell 42, i.e. whenever the first stage 12 is empty. As soon as one or more logs are transferred onto the pushers 16 in the first stage 12, the logs prevent the beam 41a from reaching the cell 42 and the latter automatically arrests the motor means of the conveyors 5. The exact nature of the operative connection between the cell 42 and the motor means for the conveyors 5 forms no part of this invention.

FIGS. 3 and 4 illustrate a modified impulse generating device 44 which is mounted at the upper end of a slightly different pusher 43. This device 44 comprises a pair of spaced parallel endless flexible elements in the form of belts 48 which are trained around pairwise arranged pulleys 46, 47 and which are provided with spaced external projections or beads 49. The pusher 43 is reciprocable between a pair of guides 45, 45a the former of which is provided in its rear face with a pair of straight slots 50 bounded at their upper ends by stop shoulders or noses 51 which cooperate with selected projections 49 of the respective belts 48 to impart motion to the belts in a sense to advance a log 38 in a direction to the left, as viewed in FIG. 3. The projections 49 momentarily located at the upper sides of the belts 48 also serve as a means for entraining the log 38. It will be readily understood that the belts 48 and the pulleys 46, 47 may be respectively replaced by endless chains and sprockets, and that the projections 49 may consist of lugs carried by the chain links. If desired, the upper runs of the belts 48 may be supported by one or more dead rolls, not shown.

The operation of a yarding apparatus which utilizes pushers 43 and impulse generating means 44 of FIGS. 3 and 4 is analogous to that of the apparatus shown in FIGS. 1 and 2. Thus, shortly before a pusher 43 reaches the end of its upward stroke, a projection 49 on each of the belts 48 strikes against the respective stop shoulder 51 and brings about a short forward movement of the respective belt in a sense to advance the log 38 in the direction indicated by the arrow 52. The length of such intermittent movements of the belts 48 is indicated in FIG. 3 by the reference character a. The length of this movement and the inclination of the belts 49 are sufficient to make sure that the log 38 starts to roll in a direction to the left or that the log is actually hurled toward the next stage or onto the chute 40 so that its inertia prevents the log from stopping before it reaches the next stage or the trough 36a, 36b. Such movements of the log are brought about even if the log is partially flat so that it cannot roll but must slide off the belts 48. The projections 49 serve as entraining and motion transmitting means for the log. For example, the belts 48 and their projections 49 may be made of rubber-like material. The angular movements of the belts 48 are terminated in a fully automatic way as soon as the respective pushers 43 reach the end of their upward strokes, and the spacing between the adjacent projections 49 is selected with a view to make sure that a projection is always received in the respective groove 50 whenever the pushers 43 approach the ends of their upward strokes.

Of course, each pair of pushers 16 or 43 can be replaced by a single pusher of a length substantially corresponding to the distance between the walls 2. However, the utilization of two or more individual pushers in each of the stages 12–15 is advisable because the overall weight and the cost of the apparatus are reduced in addition to the fact that it is much easier to repair or to replace a single defective pusher or a pair of defective pushers of the type shown in FIGS. 1 to 4 rather than to replace a bulky lifting device which extends all the way between the walls 2.

It is also possible to omit the impulse generating devices 25 or 44 and to provide the upper end portions of the pushers 16 or 43 with suitably inclined log-supporting surfaces whose inclination is normally sufficient to insure that the logs will roll off these surfaces as soon as the pushers are lifted to a level above the upper ends of the guides or of the chute 40. However, since the logs are not always straight and since the logs are seldom of perfectly cylindrical shape, the provision of impulse generating devices 25 or 44 is of considerable advantage because a bent or crooked log is not likely to roll along an inclined surface even if it is perfectly cylindrical excepting, of course, if the inclination of the supporting surface is exceptionally great. In fact, a single excessively or unusually deformed log is likely to bring about undesirable interruptions in the operation of the apparatus, for example, by failing to move off the pushers 16 in any of the stages 12–15 so that it prevents the logs at the upstream side thereof from advancing toward the carriage 36.

On the other hand, it is not always desirable to form the upper portions of the pushers 16 or 43 and/or the devices 25 or 44 with log-supporting surfaces of excessive inclination because the logs are then immediately compelled to move into frictional engagement with the left-hand guides 17, as viewed in FIG. 1, which increases friction between the logs and these guides and might lead to rapid wear of the apparatus. It was found that the provision of devices 25 or 44 (or of any equivalent impulse generating means) represents an ideal solution for the transfer of logs because, during reciprocatory movements of the pushers, the logs may rest on substantially horizontal or slightly inclined supporting surfaces and are caused to roll or to slide only at the time of actual transfer into the next stage or into the trough 36a, 36b.

The apparatus of my invention may be utilized for transfer of logs or like bulky elongated objects to machines other than the carriage 36 of FIG. 1. For example, the conveyor 11 may transfer logs to a log counting machine, to a conveyor which transfers logs to a vehicle, to a different woodpile or to any other destination.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for transferring elongated objects, particularly for transferring substantially round logs from a woodpile, comprising a multistage transfer conveyer having a first stage and at least one next stage preceded by said first stage, said conveyer comprising reciprocable pusher means in each of said stages adapted to consecutively transfer objects from a preceding stage to the next stage; propelling means movably mounted on said pusher means so as to engage said objects and promote the transfer thereof; and means for supplying objects to the pusher means in said first stage.

2. An apparatus for transferring substantially round logs from a woodpile and the like, comprising a multistage transfer conveyer having a first stage and at least one next stage preceded by said first stage, said conveyer including substantially upwardly and downwardly reciprocable pusher means in each of said stages and each of said pusher means comprising a log-supporting upper portion; means for reciprocating said pusher means so that the pusher means in a preceding stage performs an upward stroke when the pusher means in the next stage performs a downward stroke or vice versa and that the upper portions of pusher means in each preceding stage and in the stage next to the respective preceding stage are moved into temporary alignment with each other during each upward stroke of the pusher means in the respective preceding stage whereby a log supported by the upper portion of the pusher means in each preceding stage may be conveniently transferred onto the upper portion of the pusher means in the next stage when the upper portions in a preceding stage and in the next stage are aligned with each other; propelling means mounted on said pusher means so as to engage said logs and promote the transfer thereof; and supply conveyer means adjacent to said first stage and adapted to support said woodpile, said supply conveyer means comprising at least one movable endless flexible element for supplying logs to the upper portion of the pusher means in said first stage in a position of said last mentioned pusher means in which its upper portion is located at a level below the level of the upper portion of the pusher means in the stage next to said first stage.

3. An apparatus for transferring elongated objects, particularly for transferring substantially round logs from a woodpile, comprising a multistage transfer conveyer having a first stage and at least one next stage preceded by said first stage, said conveyer including substantially upwardly and downwardly reciprocable pusher means in each of said stages and each of said pusher means comprising an upper portion; combined object-supporting and impulse generating means provided on each of said upper portions for ensuring transfer of objects from each preceding stage to the next stage and from the last stage of said transfer conveyer; fixed ways for guidng said pusher means in parallel paths; means for reciprocating said pusher means along said fixed ways so that the pusher means in a preceding stage performs an upward stroke when the pusher means in the next stage performs a downward stroke or vice versa and that the impulse generating means of pusher means in each preceding stage and in the stage next to the respective preceding stage are moved into temporary alignment with each other during each upward stroke of the pusher means in the respective preceding stage whereby an object supported by the impulse generating means of the pusher means in each preceding stage may be conveniently transferred onto the impulse generating means of the pusher means in the next stage when the impulse generating means in a preceding stage and in the next stage are aligned with each other, said reciprocating means comprising rockable two-armed lever means, means for articulately connecting the arms of said lever means to said pusher means, and means for rocking said lever means; and means for supplying objects to the impulse generating means of the pusher means in said first stage in a position of said last mentioned pusher means in which its impulse generating means is located at a level below the level of the impulse generating means of the pusher means in the stage next to said first stage.

4. An apparatus for transferring elongated objects, particularly for transferring substantially round logs from a woodpile, comprising a multistage transfer conveyer having a first stage and at least one next stage preceded by said first stage, said conveyer including substantially upwardly and downwardly reciprocable pusher means in each of said stages and each of said pusher means comprising an upper portion; combined object-supporting and impulse generating means provided on each of said upper portions for enhancing transfer of objects from each preceding stage to the next stage and from the last stage of said transfer conveyer; means for reciprocating said pusher means so that the pusher means in a preceding stage performs an upward stroke when the pusher means in the next stage performs a downward stroke or vice versa and that the impulse generating means of pusher means in each preceding stage and in the stage next to the respective preceding stage are moved into temporary alignment with each other during each upward stroke of the pusher means in the respective preceding stage whereby an object supported by the impulse generating means of the pusher means in each preceding stage may be conveniently transferred onto the impulse generating means of the pusher means in the next stage when the impulse generating means in a preceding stage and in the next stage are aligned with each other; and means for supplying objects to the impulse generating means of the pusher means in said first stage in a position of said last mentioned pusher means in which its impulse generating means is located at a level below the level of the impulse generating means of the pusher means in the stage next to said first stage.

5. An apparatus as set forth in claim 4, wherein said transfer conveyer includes a last stage and further comprising means provided at least in said last stage for adjusting the capacity thereof.

6. An apparatus as set forth in claim 5, wherein each capacity adjusting means comprises a baffle plate movable relative to the respective pusher means, and means for moving said baffle plate in directions substantially perpendicular to the direction of reciprocation of the respective pusher means.

7. An apparatus as set forth in claim 4, wherein each of said impulse generating means comprises a two-armed lever having an object-supporting longer arm and a shorter arm, said levers turnably mounted on the upper portions of the respective pusher means, and stationary stop means adjacent to and adapted to turn said shorter arms when the respective pusher means perform upward strokes so as to rock the respective longer arms and to cause the objects to move off the longer arms.

8. An apparatus as set forth in claim 4, wherein each of said impulse generating means comprises at least one object-supporting endless flexible element mounted on the upper portion of the respective pusher means, and means for advancing said flexible elements through predetermined distances during each upward stroke of the respective pusher means.

9. An apparatus as set forth in claim 8, wherein each of said impulse generating means further comprises a pair of spaced rollers mounted on the upper portion of the respective pusher means, said flexible elements trained around the respective pairs of rollers.

10. An apparatus as set forth in claim 9, wherein each of said flexible elements comprises external projections and the means for advancing said flexible elements are fixed stops located in the path of said projections so as to advance the flexible elements around the respective rollers in response to upward strokes of the respective pusher means.

11. An apparatus for transferring elongated objects, particularly for transferring substantially round logs from a woodpile, comprising a multistage transfer conveyer having a first stage and at least one next stage preceded by said first stage, said conveyer comprising reciprocable pusher means in each of said stages adapted to consecutively transfer objects from a preceding stage to the next stage; propelling means mounted on said pusher means so as to engage said objects and promote the transfer thereof; conveyer means for supplying objects to the pusher means in said first stage; and control means for automatically arresting said conveyer means when an object is supported by the pusher means in said first stage.

12. An apparatus as set forth in claim 11, wherein said conveyer means comprises at least one object-supporting endless flexible element, sprocket means for driving said flexible element, and electric motor means for rotating said sprocket means, said control means comprising photoelectric means connected in the circuit of said motor means and located at one side of said first stage, and a source of light located at the other side of said first stage for normally directing a beam of light onto said photoelectric means, said photoelectric means completing the circuit of said motor means when the light beam is not interrupted and automatically interrupting the circuit of said motor means when the light beam is interrupted by an object supplied onto the pusher means in said first stage.

References Cited by the Examiner
UNITED STATES PATENTS

| | | | |
|---|---|---|---|
| 1,187,744 | 6/16 | Keller | 198—219 |
| 1,696,803 | 12/28 | Kronqvist | 198—218 |
| 2,662,633 | 12/53 | Kingsley | 198—37 |

FOREIGN PATENTS 36,333  2/30  France.

ERNEST A. FALLER, *Primary Examiner.*

WILLIAM B. LA BORDE, *Examiner.*